United States Patent
Angeloni

[15] 3,680,043
[45] July 25, 1972

[54] VEHICLE SPEED MONITORING SYSTEMS

[72] Inventor: Paul Angeloni, R.F.D. #2, Harrison, Maine

[22] Filed: Nov. 25, 1969

[21] Appl. No.: 879,854

[52] U.S. Cl.............................340/33, 325/117, 179/1 VE
[51] Int. Cl. .......................................................G08g 1/00
[58] Field of Search ...................340/32, 33, 34; 325/1, 117; 179/41 A, 1 VE

[56] References Cited

UNITED STATES PATENTS

| | | | |
|---|---|---|---|
| 2,255,055 | 9/1941 | Halstead | 340/32 |
| 3,550,076 | 12/1970 | Kent | 340/32 X |
| 2,734,131 | 2/1956 | Magnuski | 325/1 X |
| 2,640,979 | 6/1953 | Carter | 340/32 X |
| 2,656,002 | 10/1953 | Keeton et al | 180/82.1 |

Primary Examiner—William C. Cooper
Attorney—Robert Shaw

[57] ABSTRACT

A system is disclosed for monitoring speed of highway vehicles from a central control station. The system includes posting devices positioned at intervals along the highway and adapted to receive a speed message from the control station and transmit the speed message to passing vehicles in a limited region of the highway in the form of an r-f signal. Each vehicle contains an r-f receiver which is connected to the vehicle speedometer or other vehicle indication means in a manner that will provide, upon the occurrence of some predetermined excessive speed, an indication to the driver of the vehicle that the speed limit at that particular region of the highway is being exceeded. There is provision, also, for means for reporting back to the control station the occurrence of excessive vehicular speed as well as for providing accident warnings and the like.

20 Claims, 8 Drawing Figures

PATENTED JUL 25 1972          3,680,043

Inventor
Paul Angeloni
by Robert Shaw
Attorney

Inventor
Paul Angeloni
Attorney

VEHICLE SPEED MONITORING SYSTEMS

The present invention relates to apparatus for remote speed control of highway vehicles and particularly to apparatus whereby signals indicative of allowable speed are transmitted to passing vehicles at spaced intervals along the highway.

Speed control of highway vehicles such as automobiles, trucks, etc., has become a matter of great public concern particularly in recent times with the advent of higher powered vehicles and the dramatic increase in highway travel. There has been, therefore, a major effort directed to updating the approach to controlling the speed of such vehicles, including the use of radar systems and the like. An object of the present invention is to provide a high speed control system whereby the posting of the speed limit at any particular region along a highway can be effected from some remote location, a radio-frequency or other signal representative of the posted speed being transmitted to a limited region of the highway to be received by vehicles passing through that limited region and interpreted by apparatus in the vehicles.

A further object is to provide an audible signal within the vehicle, which is energized upon the occurrence of excessive vehicular speed.

A still further object is to provide means for transmitting a message back to said remote location from the vehicle, the nature of the message being indicative, for example, of the occurrence of an excessive vehicular speed, an accident on the highway, or some other similar type event.

Still other and further objects are contained in the following description and are particularly delineated in the appended claims.

By way of summary, the objects of the invention are attained in highway speed monitoring apparatus that includes a plurality of posting devices for disposition along the highway, each device comprising a transmitter adapted to transmit a signal to a limited region of the highway to provide an indication of proper vehicle speed at said region. A receiver mounted in each vehicle is connected to a speedometer or other vehicular speed indicating means. The receiver functions to receive and interpret the transmitted signal and is interconnected with the speedometer in such a way that upon the occurrence of excessive speed by the vehicle, as represented by the signal from the posting device, a circuit is completed to a sound generating device, light or other mechanism within the vehicle thereby to alert the driver that he is exceeding the posted speed limit.

The invention will now be explained with reference to the accompanying drawing in which.

The concept herein discussed is concerned with transmitting a remotely controlled speed limit signal from a stationary signal device to passing vehicles. In the preferred embodiment the signal is in the form of a radio frequency (r-f) signal which contains modulation that can be removed by appropriate receiving means in the vehicles and interrelated with the vehicle speed to provide an indication to the operator of the vehicle of the occurrence of speed in excess of the posted limit. In the preferred form of apparatus the various speed limits are assigned frequencies of say 17 to 21 KHz., representing speeds of, say, 30 to 70 mph, and the frequencies are imposed as speed messages upon a carrier for transmittal. The highway vehicles are each provided with a receiver adapted to receive and interpret the signal, the receiver being electrically connected to a speedometer to relate proper speed with vehicle speed and to provide an indication to the driver and/or some remote operator of the existence of excessive speed.

Figure 1:
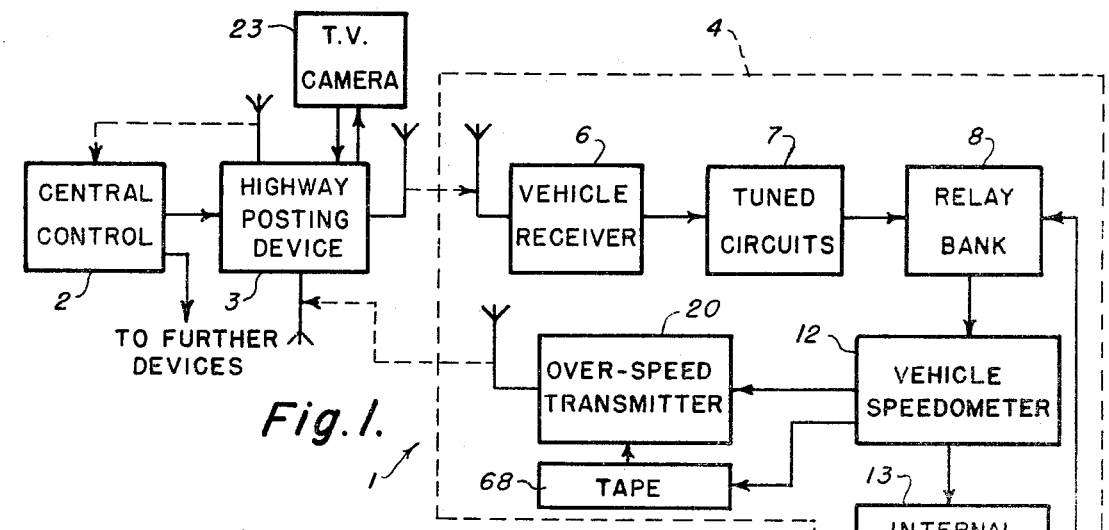
FIG. 1 is a block diagram of a system embodying the present inventive concept.

Turning now to the figures, a system for monitoring vehicles on a highway is shown generally at 1, in FIG. 1. The system is adapted to allow an operator at some remote central control location 2 to control r-f outputs from a plurality of highway posting devices 3 (one such device only is shown in FIG. 1). The r-f output of each such device is controlled by the operator to provide an output signal containing a message which is interpreted by apparatus in a passing vehicle traveling along the highway in the vicinity of the device 3 to provide an indication of proper vehicle speed at that particular region of the highway. The vehicle apparatus is at which is contained within the block designated 4 in FIG. 1; the block 4, for present purposes, is a schematic representation of a vehicle passing along the highway in the vicinity of the posting device 3.

Figure 2:
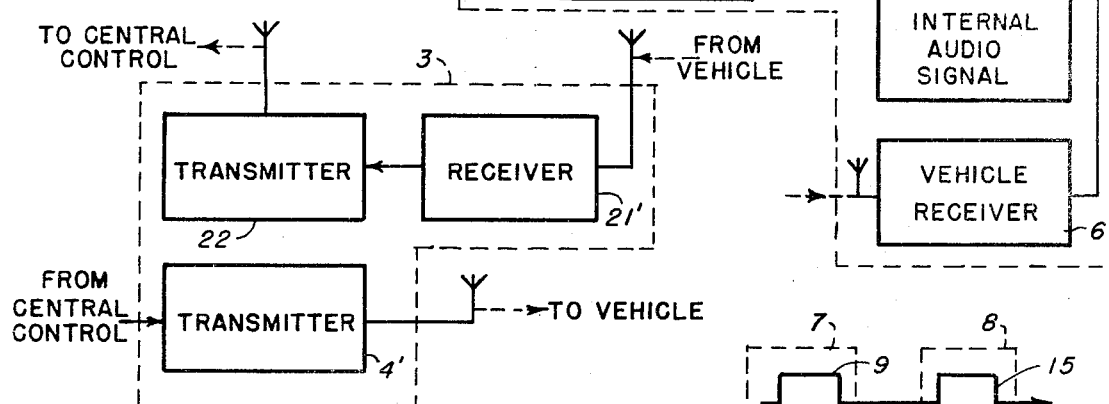
FIG. 2 is a block diagram of a portion of the system of FIG. 1.
Figure 3:
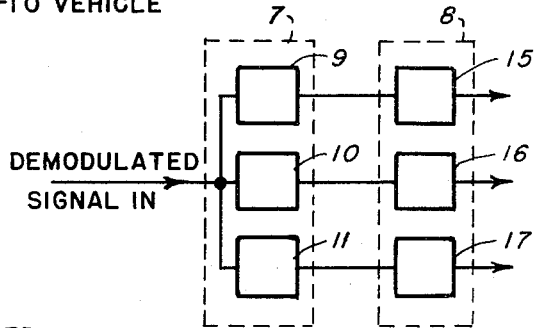
FIG. 3 is a block diagram of a further portion of the system of FIG. 1.

Each posting device 3, as shown in FIG. 2, contains a transmitter 4' adapted to transmit an r-f signal to a limited region of the highway in the immediate vicinity of the posting device. A receiver 6 is mounted in each vehicle 4 to receive, amplify and demodulate the signal; the output of the receiver 6 is connected to a plurality of tuned circuits 7, the output of each tuned circuit being connected to a relay of a relay bank 8 as shown more particularly in FIGS. 3 and 5. In FIG. 3 a plurality of such tuned circuits is shown at 9, 10 and 11 respectively, connected to the control coils or other control means of relay-type switches 15, 16 and 17. Each tuned circuit is tuned to a particular frequency to pass a control voltage along to the associated relay only on the occurrence of such particular frequency. The particular tuned circuit which provides an output voltage to its associated relay is determined by the output of the transmitter 4', and, more particularly, by the modulation message. Thus, the output of the transmitter 4' can be frequency modulated or amplitude modulated and the modulation message is separated from the r-f carrier by the receiver 6, the modulation message being passed from the receiver 6 to the tuned circuits 7, as mentioned.

The relay bank 8 functions in conjunction with a multiple-contact speedometer 12 to provide an audio indication of excessive speed to the vehicle operator by actuating a buzzer or other sound means 18 contained within an internal audio signal means 13. The speedometer, except upon the occurrence of excessive vehicle speed, functions similarly to speedometers now used in motor vehicles. The foregoing function is illustrated schematically in FIG. 4 where the relay 15 only is shown connected to electrical contacts designated 40 and 45 in the figure; the numerals 40 and 45 (and also the numerals 50, 55, 60, 65 and 70) represent designation of the electrical contacts in the speedometer as well as vehicle speed designations.

Figure 4:
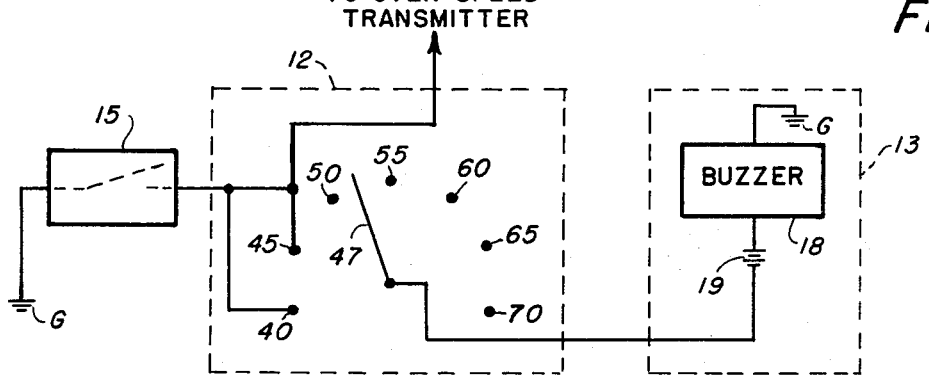
FIG. 4 is a circuit diagram of a simplified multicontact speedometer that may be used in the system shown in FIG. 1.

Assume the relay 15 is closed under the control of the signal from a particular posting device 3, and assume further that the posted speed is 35 mph. The relay 15 is connected, as shown, to the electrical contact point 40 so that at 40 mph an electric circuit is completed from ground G through the relay 15 and the speedometer 12 (the speedometer needle, designated 47, functions as a brush, as later explained) to a battery 19 and thence the buzzer 18 to ground G. (Ground here designates a common chassis connection rather than actual earthing.) At 45 mph a circuit is completed through the contact 45 to an over-speed transmitter 20 which, as hereinafter discussed, transmits a pre-recorded message to the posting device 3. The circuit in FIG. 4 is an over-simplification of circuitry which actually is used to perform the functions just described. Thus, it is not desirable that the electric circuit through the contact 45 make and then break, but, rather, it is necessary that the circuit once made be maintained. Also, it is desirable that the circuit not be closed to the transmitter 20 upon the occurrence of shortmtime speeds that exist during passing, for example. Thus, the circuit shown in block diagram form in FIG. 5, is used in operable systems; some of the numerals shown in FIG. 5 duplicate numerals previously used to designate similarly functioning apparatus.

Figure 5:
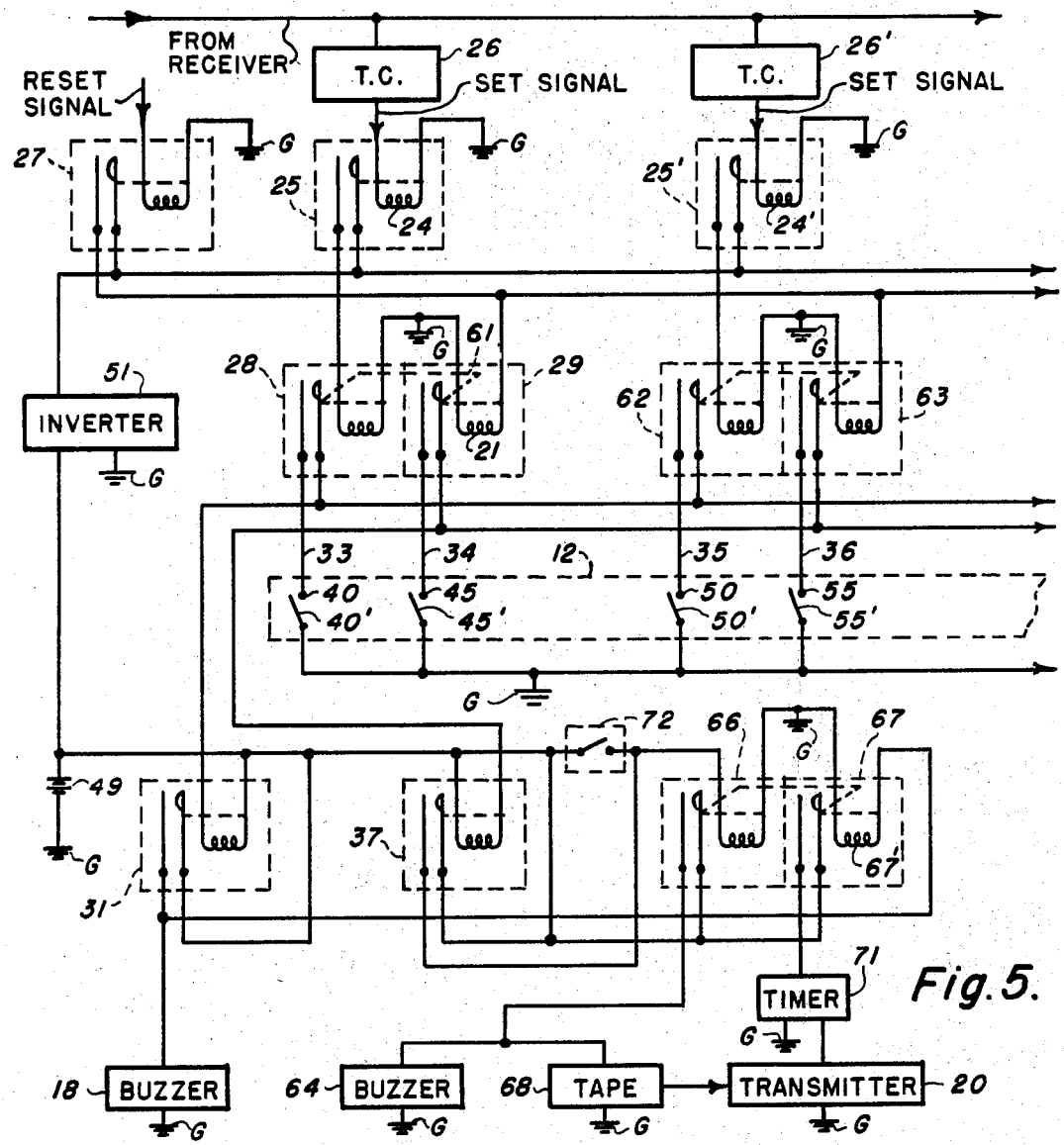
FIG. 5 shows in detail a number of the block circuits of FIG. 1.

The circuit shown in FIG. 5 includes a plurality of momentary relays 25, 25', etc. (for simplicity only two such relays and associated elements are shown, but in operable apparatus several more such relays would be used and would operate in the manner hereinafter outlined in connection with relays 25 and 25') connected to receive what is termed a "set signal" from associated tuned circuits 26, 26', etc., respectively, the set signal being connected to energize the coils 24 and 24', etc. of the respective relays. Each of the momentary relays is connected to further relays to make up a relay set. The explanation to follow is, in the main, concerned with the relay 25 and associated elements since all the relay sets function similarly.

The output of the vehicle receiver 6 is at the 17 KHz. to 21 KHz. modulation frequencies before mentioned; the output is connected to the tuned circuits 7, shown in FIG. 5 to be the tuned circuits 26, 26', etc. If the modulation is at the resonant frequency of the tuned circuit 26 a voltage will appear as a pulse across the coil 24 of the relay 25. The relay 25 is normally open and upon receiving the voltage pulse its contacts close momentarily. The contacts of the relay 25 are serially connected with the coil of a latching relay 28, the complete circuit being from ground through a battery 49 to an inverter 51 (12 volts dc to 110 volts ac in operable apparatus), the output of the inverter being connected through the relay 25 and the coil of the relay 28 and back to ground. The relay 28 is normally open and when closed, upon energization of its coil, it remains closed until opened by a relay 29 in a manner hereinafter discussed. The contacts of the relay 28 are connected in series with a switch 40' in the speedometer 12 by a conductor 33 and then to ground. When the contacts of the relay 28 are closed a circuit is completed from ground through the battery 49, through the coil of a relay 31, through the relay 28 and the speedometer switch 40', when closed, to ground. In this fashion the vehicle apparatus is "set" to provide an indication of excess speed above the 35 mph speed limit previously discussed; in the disclosed example the indication is activation of the buzzer 18.

Figures 6, 7:
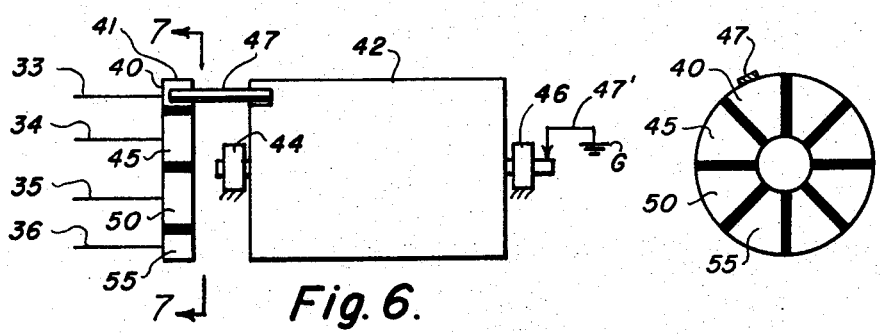
FIG. 6 is a side view of a multi-contact speedometer that might be used in connection with operative apparatus.
FIG. 7 is a view taken upon the line 7—7 in FIG. 6, looking in the direction of the arrows.

As shown in FIGS. 6 and 7, the function of the switches shown at 40', 45', 50' and 55' in FIG. 5 can be performed by a multi-contact speedometer having stationary commutator 41 and a revolvable member 42 adapted to revolve upon bearings 44 and 46 to various angles from some zero point as a function of vehicle speed. The brush 47 and wiper 47' serve to complete a circuit to the particular commutator segment 40, 45, 50, etc. It will be noted that electrical contact between the brush 47 and, say, the segment 40 will continue, once made, for some period of time since each segment spans about four mph (the intermediate insulation spans about one mph). From the foregoing explanation, it can be seen that in order for the relay 31 to close two events must occur: one, the relay 28 must be closed by a signal from the receiver 6 and, two, the speedometer 12 must be in a position to provide contact between the brush 47 and the contact element 40 (i.e., the switch 40' in FIG. 5 must be closed). The relay 31, when closed, is connected to energize a buzzer or other sound device, as before mentioned, the circuit being from the battery 49 through the relay 31 to the buzzer 18.

The relay 29 is mechanically interconnected with the relay 28, as represented by the dotted line labeled 61, to open and close with the relay 28, and it is a normally open, momentary type relay which, in the absence of the mechanical interconnection, would not close but when closed it opens upon the occurrence of a voltage across its coil shown at 21 in FIG. 5. The voltage to the coil 21 is furnished by the inverter 51 through a relay 27 which acts to reset to open the latching relay 28 and further similarly functioning relays 62, etc.

Figure 8:
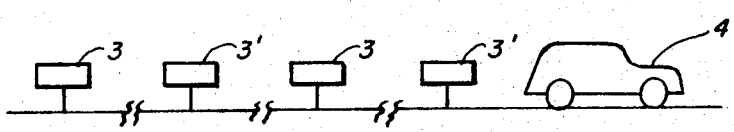
FIG. 8 is a schematic representation showing a limited portion of a highway and a plurality of posting devices disposed therealong.

Resetting is accomplished in each instance by applying a voltage to the coil of the associated mechanically interconnected relay such as, for example, the relay 29 in the case of the relay 28 and a momentary relay 63 in the case of the relay 62. The coils of the relays 29, 63, etc. are so wound that, when energized, each opens the contacts of the respective relays 29, 63, etc., and thereby opens the contacts of the relays 28, 62, etc. respectively interconnected therewith. The relay 27 is also a normally open momentary relay and its contacts are closed upon receipt of a reset voltage by its coil from the vehicle receiver labeled 6' in FIG. 1. The reset signal originates at a posting device 3' which contains a transmitter which transmits a continuous r-f signal to a limited region of the highway. When an automobile passes the device 3', all the relays 28, 62, etc. are reset to open. The receiver 6' (as does also, the receiver 6) includes input means to receive the r-f carrier, amplifier circuitry, and mixing circuitry to remove a modulation signal from the carrier, and it is the modulation signal that is connected to the coil of the relay 27. The posting devices 3', as shown in FIG. 8, are disposed between the posting devices 3 along the highway, thereby to reset the automobile circuitry just prior to passing a subsequent device 3 for receipt of a further speed signal (which may differ from the speed signal of the last device 3). The rest posting devices 3' may also be placed at entrance ramps of limited access highways.

In the explanation in the previous paragraphs the speed limit was taken to be 35 mph and the buzzer 18, as explained, is caused to emit sound when the vehicle speed reaches 40 mph, at which time the switch 40' closes. At 45 mph the switch 40' opens and a switch 45' closes thereby completing an electric circuit from the battery 49 through the coil of a normally open relay 37, the relay 29, and the switch 45' to ground. The relay 37, when closed, completes a circuit to a further buzzer 64. The relay 37 is a momentary relay but it remains closed so long as the switch 45' and the relay 29 are closed. If the vehicle speed increases much above 45 mph, the switch 45' opens which, in the absence of some alternate arrangement, would result in the opening of the circuit to the buzzer 64. To prevent that possibility, a latching relay 66 is provided and connected to close when the relay 37 closes so that even when the relay 37 opens a complete circuit exists from the battery 49 through the relay 66 to the buzzer 64. Only by reducing the vehicle speed down to 40 mph can the buzzer 64 be disconnected. When that is done, the relay 31 is closed, as before, and a circuit is completed through the relay 31 to the coil labeled 67' of a relay 67; the coil 67' is wound so that, when energized, it opens the contacts of the relay 67, and, thus, the relay 66 to which it is mechanically interconnected, as shown. When the relays 66 and 67 are in the closed condition, they serve also to complete circuits to a tape device 68 and the transmitter 20. The tape plays some pre-recorded message, such as the vehicle registration number, repetitiously, and the transmitter 20, if the circuit remains closed 10 to 15 seconds, transmits the message to the nearest posting device 3 for transmittal to the central control 2. The particular posting device receiving and re-transmitting the message is, of course, known at the central control 2. The tape 68 and transmitter 20 cease to function when the relays 66 and 67 are opened in the manner before discussed. The delay is furnished by a delay means 71.

The switch shown at 72 in FIG. 5 is manually operated and provides means by which the relay 66 can be closed irrespective of messages from other parts of the circuit and can be used to indicate occurrence of an accident, breakdown or the like. The posting devices 3 can include lighted speed signs, warning lights and the like, all of which can be controlled from the central control 2, and in central control the position of the various posting devices can be shown on a highway map by the use of small lights positioned at equivalent locations on the map thus enabling an operator to locate the region of the accident or breakdown and take appropriate action.

The discussion in the previous paragraphs relates to a situation in which the speed limit is set at 35 mph. Upon occurrence of an excess speed of, say, 45 mph for some predetermined length of time a pre-recorded message on a magnetic tape or the like, is transmitted by the transmitter 20. The taped message can contain the registration number of the violating vehicle, for example. By using appropriate switching and taped message, the transmitter 20 can function to report accidents along the highway, as well, as before discussed. The transmitted message from the transmitter 20 is received by a receiver 21' and re-transmitted to the central control station 2 by a transmitter 22. A television camera 23 can be mounted upon the posting device 3 to provide visual monitoring of the highway in the vicinity of the device and signals from the camera can be transmitted by microwave, line-of-sight transmission or coaxial cable, as desired.

The speed signals from the central control 2 to the posting device 3 can be carried over telephone lines. Posting a particular speed can be accomplished by closing a push-button or other switch at the central control station to energize a particular oscillator in the posting device thereby to provide, for example, a predetermined frequency output from the device; or speed indication signals can be provided by amplitude or frequency modulating a carrier.

The relay used may be conventional relay switches or semiconductor switches or reed switches, and integrated circuitry may be used to provide compact packaging of large portions of the apparatus herein described. These and further modifications will occur to persons skilled in the art.

What is claimed is:

1. A system for remotely establishing speed limits for vehicles on a highway and for monitoring the speed of the vehicles that comprises, in combination, a plurality of posting devices disposed along the highway, each device including a transmitter adapted to transmit a radio frequency signal to a limited region of the highway, the signal being modulated to provide an indication of proper speed at said region, a receiver mounted in each vehicle to receive and demodulate said signal, the output of the receiver being connected to a plurality of tuned circuits, switch means connected to receive the output of each tuned circuit and to be controlled by a voltage from the associated tuned circuit, the particular tuned circuit which provides an output voltage being determined by the output frequency of the demodulated receiver output, a speedometer having electric contact points at various speed positions and pickup means adapted to make electrical contact with the contact points upon the occurrence of a particular speed and complete an electric circuit thereby through the switches and means for conveying a modulation signal from a central control station to the posting devices to establish the speed limit at each region posting the highway.

2. A system as claimed in claim 1 in which the transmitter is frequency modulated to provide an output frequency that is indicative of proper speed of vehicle operation.

3. A system as claimed in claim 1 in which the transmitter is amplitude modulated to provide an output signal that comprises a modulated carrier, the modulations providing the means by which proper speed signals are transmitted to the vehicle.

4. A system as claimed in claim 1 which includes a warning device connected in said electric circuit to be actuated upon occurrence of said particular speed.

5. A system as claimed in claim 4 in which the warning device includes a buzzer and the like to provide the driver of the vehicle with an indication of excess vehicle speed.

6. A system as claimed in claim 5 and including apparatus adapted to play a recorded message and a further transmitter to transmit the message, delay means being provided in said apparatus to provide a message only at such times as the vehicle exceeds proper speed by a predetermined amount for a predetermined time period.

7. A system as claimed in claim 6 in which the posting device contains a receiver tuned to receive the message transmitted from the vehicle and a still further transmitter to re-transmit the message to the central control station.

8. A system as claimed in claim 7 including manual switch means associated with each further transmitter for producing a signal of a predetermined nature to the further transmitter for transmittal to said central control station.

9. A system as claimed in claim 1 including a control circuit connected between said posting device and the central control station, the modulation of the signal transmitted from each posting device being effected from said central control station.

10. A system for remotely establishing speed limits for vehicles on a highway and for monitoring said vehicles that comprises, in combination, a plurality of posting devices disposed along the highway, each device including a transmitter adapted to transmit a signal to a limited region of the highway, the signal being modulated to provide a message indicative of proper vehicle speed at said region, a receiver mounted in each vehicle to receive said signal and provide an output, speed detecting means having means at various vehicle speeds to complete an electric circuit upon occurrence of the particular speed, the receiver and the speed detecting means being so interconnected that the speed in which the circuit is completed is determined by the output of the receiver, and means for conveying said message from a control station to the posting devices to establish the speed limit at each region of the highway.

11. A system as claimed in claim 10 in which the signal is at radio frequency and the receiver demodulates the signal to provide an output which is connected to a plurality of tuned circuits.

12. A system as claimed in claim 11 in which the speed detecting means is a multiple-electric-contact speedometer and in which a relay bank is connected between the tuned circuit and the contacts of the speedometer, one relay of said bank being serially connected with each contact of the speedometer to complete a circuit through said one relay to the associated speedometer contact in response to a voltage from the tuned circuit associated with said one relay.

13. A system as claimed in claim 12 in which the relay bank comprises a plurality of relay sets, each such set being connected to receive the output of a particular tuned circuit, and each set comprising: a momentary relay the holding coil of which is connected to receive the tuned circuit output, a latching relay the holding coil of which is connected in series with the momentary relay, and a further momentary relay mechanically interconnected to reset the latching relay, the latching relay of each set being serially connected to one speedometer contact and the further momentary relay being serially connected to another speedometer contact to complete a circuit through each of the relays to the associated speedometer contact in response to a voltage from said particular tuned circuit.

14. A system as claimed in claim 13 in which the speedometer comprises a brush adapted to move from contact to contact in response to changes in vehicle speed and thereby complete a circuit through the particular contact to the brush upon occurrence of that particular speed.

15. Apparatus of claim 14 and including audio means connected to be actuated when the circuit is closed through the brush thereby to indicate the existence of excessive speed.

16. A system as claimed in 13 in which further posting devices are disposed along the highway, each such further device having a transmitter, and a further receiver mounted in each vehicle to receive the output of the further transmitter and connected to provide a reset voltage to said further momentary relay.

17. A system as claimed in claim 16 in which the further receiver provides an output to a momentary reset relay the contacts of which are serially connected with the coils of each said further momentary relay thereby, upon receipt of a reset signal, to activate each of the further momentary relay to reset each of the latching relays.

18. A system for remotely establishing speed limits for vehicles on a highway and for monitoring said vehicles that comprises, in combination, a plurality of posting devices disposed along the highway, each device including a transmitter adapted to transmit a signal to a limited region of the highway to provide an indication of proper vehicle speed at said region, means to control the transmitter from a remote location to impose a message upon the transmitted signal indicative of proper speed at said region, a receiver mounted in each vehicle to receive said signal and provide an output, and speed detecting means mounted in each vehicle, the receiver and the speed detecting means being interconnected to provide a indication of vehicle speed in excess of the proper vehicle speed at said region.

19. A system as claimed in claim 18 that includes means in the vehicle operable to play a recorded message and a further transmitter to transmit the message and in which each posting device contains a receiver tuned to receive the message transmitted from the vehicle and a still further transmitter to retransmit the message to said remote location.

20. A system as claimed in claim 19 that includes switch means associated with each said further transmitter to initiate the playing of a recorded message for transmittal to the remote location.

* * * * *